US007445172B1

(12) United States Patent
Bucknor

(10) Patent No.: US 7,445,172 B1

(45) Date of Patent: Nov. 4, 2008

(54) HAND-OPERABLE PILL CRUSHING APPARATUS

(76) Inventor: Hilword Bucknor, 3207 W. Bange Ave., Neptune, NJ (US) 07753

( * ) Notice: Subject to any disclaimer, the term of this patent is extended or adjusted under 35 U.S.C. 154(b) by 79 days.

(21) Appl. No.: 11/525,159

(22) Filed: Sep. 22, 2006

Related U.S. Application Data

(60) Provisional application No. 60/732,202, filed on Nov. 2, 2005.

(51) Int. Cl.
*A47J 17/00* (2006.01)
*A47J 43/00* (2006.01)

(52) U.S. Cl. .................. 241/169; 241/169.2; 241/84.3; 241/DIG. 27

(58) Field of Classification Search ................. 241/168, 241/169, 169.2, DIG. 24, 84.3, 95; 221/25
See application file for complete search history.

(56) References Cited

U.S. PATENT DOCUMENTS

| | | | | |
|---|---|---|---|---|
| 632,444 | A * | 9/1899 | Haussinand | 425/318 |
| 970,863 | A * | 9/1910 | Wasldvogel | 241/169 |
| 979,369 | A * | 12/1910 | Baudement et al. | 278/106 |
| 5,178,337 | A * | 1/1993 | Lupoli | 241/169 |
| 5,924,636 | A | 7/1999 | Calderon | |
| 6,637,683 | B1 | 10/2003 | Lomax-Wilbur | |
| 6,637,685 | B1 | 10/2003 | Kruger | |
| 6,966,509 | B2 * | 11/2005 | Janzen | 241/169 |

* cited by examiner

*Primary Examiner*—Bena Miller

(57) ABSTRACT

A pill-crushing apparatus includes first and second arms having axially offset proximal and distal ends. The proximal end of the first arm is provided with a handle and a pair of apertures. The proximal end of the second arm has a handle and an opening. The arms are pivotally conjoined midway along respective longitudinal lengths thereof. The first arm has a male pill-crushing block provided with a dome-shaped bottom surface that is statically coupled to a distal end of the first arm. The second arm has a female pill-holding cup with an arcuate inner bottom surface that is anchored to a distal end of the second arm. The cup has a hollow semi-spherical shape and articulates about a fulcrum axis registered orthogonal to the longitudinal length of the second arm. A pill splitting mechanism includes shoulders formed with the first and second arms and protruding away therefrom.

15 Claims, 5 Drawing Sheets

HAND-OPERABLE PILL CRUSHING APPARATUS

CROSS REFERENCE TO RELATED APPLICATIONS

This application claims the benefit of U.S. Provisional Application No. 60/732,202, filed Nov. 2, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a pill crushing apparatus and, more particularly, to a hand-operable pill crushing apparatus for adapting solid pills into particulates.

2. Prior Art

Medications are commonly provided in the form of pills or tablets, and it is well known that these can be difficult to swallow for various persons. Consequently, various pill crushers have been proposed in the prior art for crushing pills and tablets so as to convert the medications into powder form, which can be more easily ingested by such persons.

One prior art example shows a pill crusher that has an arm extending over and along an elongate base, with a pivotal connection between the base and one end of the arm. An upwardly open cylindrical housing on the base has a longitudinal axis perpendicular to the base and a compression spring in the cylindrical housing between a cylindrical anvil member and the base. Interengaged guide formations on the housing and the anvil member at opposite sides of the housing are inclined so as to cause rotational movement of the anvil member relative to the cylindrical housing on displacement of the anvil member along the longitudinal axis against the action of the spring; and a cylindrical pressure member depending from the arm above the cylindrical housing. In use, the rotational movement of the anvil member causes a pill to be both crushed and also simultaneously ground between the pressure and anvil members, which have serrated opposed faces to improve the grinding. Unfortunately, this prior art example does not provide a receptacle for containing the pill once it has been crushed.

Another prior art example shows a hand-held pill crusher with an arm and base made of a hard and impervious material connected at one end so as to allow a vertical open and close movement to fragment and then crush pill into powdered form. The arm contains a plurality of stainless steel blades for fragmenting pill and a crushing member made of similar hard and impervious material for reducing fragments to powder. The base contains a pill rack, threaded recess for crushing member and a track on underside for holding spoon-like receiving member. Unfortunately, this example uses sharp blades to crush a pill which can expose a user to the possibility of injury by the blades during use of the invention.

Accordingly, a need remains for a hand-operable pill crushing apparatus in order to overcome the above-noted shortcomings. The present invention satisfies such a need by providing an apparatus that is simple and easy to use, is lightweight yet durable in design, and allows a user to efficiently crush pills into powder form. Designed for users who have trouble swallowing pills, such an apparatus effectively relieves a user from the frustrating and unpleasant alternative of having to chew a pill. The apparatus is inexpensive and easily packed for travel.

BRIEF SUMMARY OF THE INVENTION

In view of the foregoing background, it is therefore an object of the present invention to provide an apparatus for a hand-operable pill crushing apparatus. These and other objects, features, and advantages of the invention are provided by a hand-operable pill crushing apparatus for adapting solid pills into particulates.

The pill-crushing apparatus includes first and second elongated arms that conveniently have axially offset proximal and distal ends respectively. Such a proximal end of the first arm is conveniently provided with a handle directly coupled thereto and also has a pair of apertures advantageously formed therein. Such a proximal end of the second arm has a handle directly coupled thereto and is provided with an opening formed therein. The first and second arms are pivotally conjoined directly together midway along respective longitudinal lengths thereof, such that the handles of the first and second arms are releasably engaged during operating conditions. The longitudinal length of the first arm is greater than the longitudinal length of the second arm.

Each of the first and second arms is preferably provided with a medially located annular portion. Such an annular portion of the first arm has a solid body and includes a centrally oriented rib protruding outwardly therefrom. Such an annular portion of the second arm has an aperture centrally formed therein. Such a rib is rotatably seated within the aperture of the annular portion of the second arm. Each of such first and second arms further includes a first substantially linear region that has axially opposed ends directly connected to the associated handle and an annular portion respectively. A second substantially linear region has axially opposed ends directly connected to an associated annular portion and one of the male pill-crushing block and the pill-holding cup respectively. The first and second regions of the first and second arms are diametrically offset.

The apparatus further includes a first arm that has a rigid male pill-crushing block provided with a dome-shaped bottom surface. Such a male pill-crushing block is statically coupled directly to a distal end of the first arm. The second arm conveniently has a pivotal female pill-holding cup adjustably anchored directly to a distal end of the second arm. Such a female cup has a conveniently arcuate inner bottom surface such that the male block is directly and removably interfitted within the female cup when the first and second arms are separated beyond a predetermined distance.

The pill-holding cup has a convenient hollow semi-spherical shape for effectively containing the particulates therein. The female cup advantageously articulates about a fulcrum axis registered orthogonal to the longitudinal length of the second arm while the male pill-crushing block is removed from the female pill-holding cup. The distal end of the second arm includes a U-shaped prong provided with laterally spaced ends that are pivotally coupled directly to the pill-holding female cup such that the pill-holding female cup freely rotates along a 360 degree path.

The apparatus further includes a mechanism for effectively splitting a first pill into at least two separate halves when the first and second handles are pivotally disengaged such that a second pill is simultaneously pulverized within the pill-holding cup. Such a pill splitting mechanism conveniently includes a plurality of shoulders monolithically formed with the first and second arms and protruding away therefrom such that the shoulders directly mate when the male pill-crushing block is nested within the pill-holding cup. Each of such shoulders preferably has a linear and planar engaging surface for advantageously providing an equal and clean cut along the first pill.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
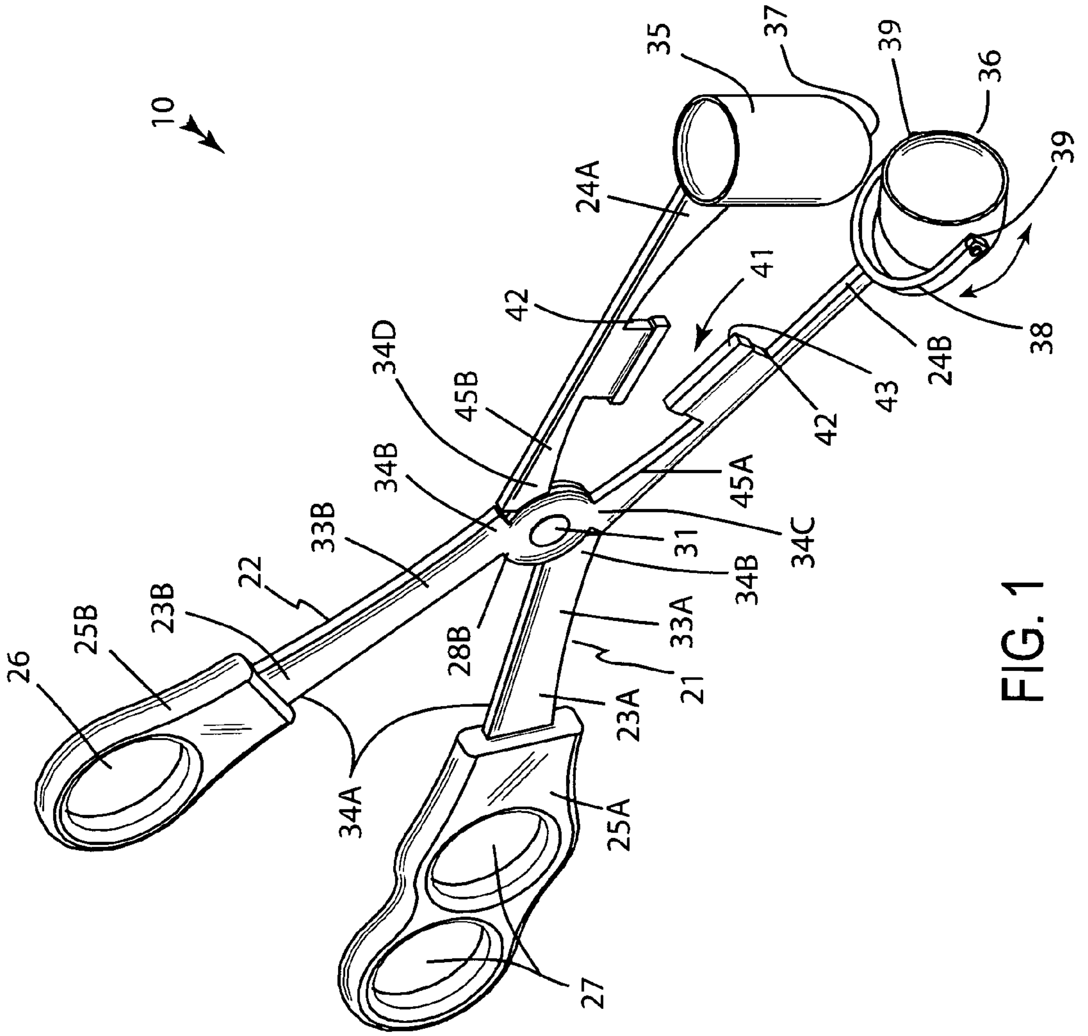
FIG. 1 is a perspective view showing a hand-operable pill crushing apparatus, in accordance with the present invention.
Figure 2:
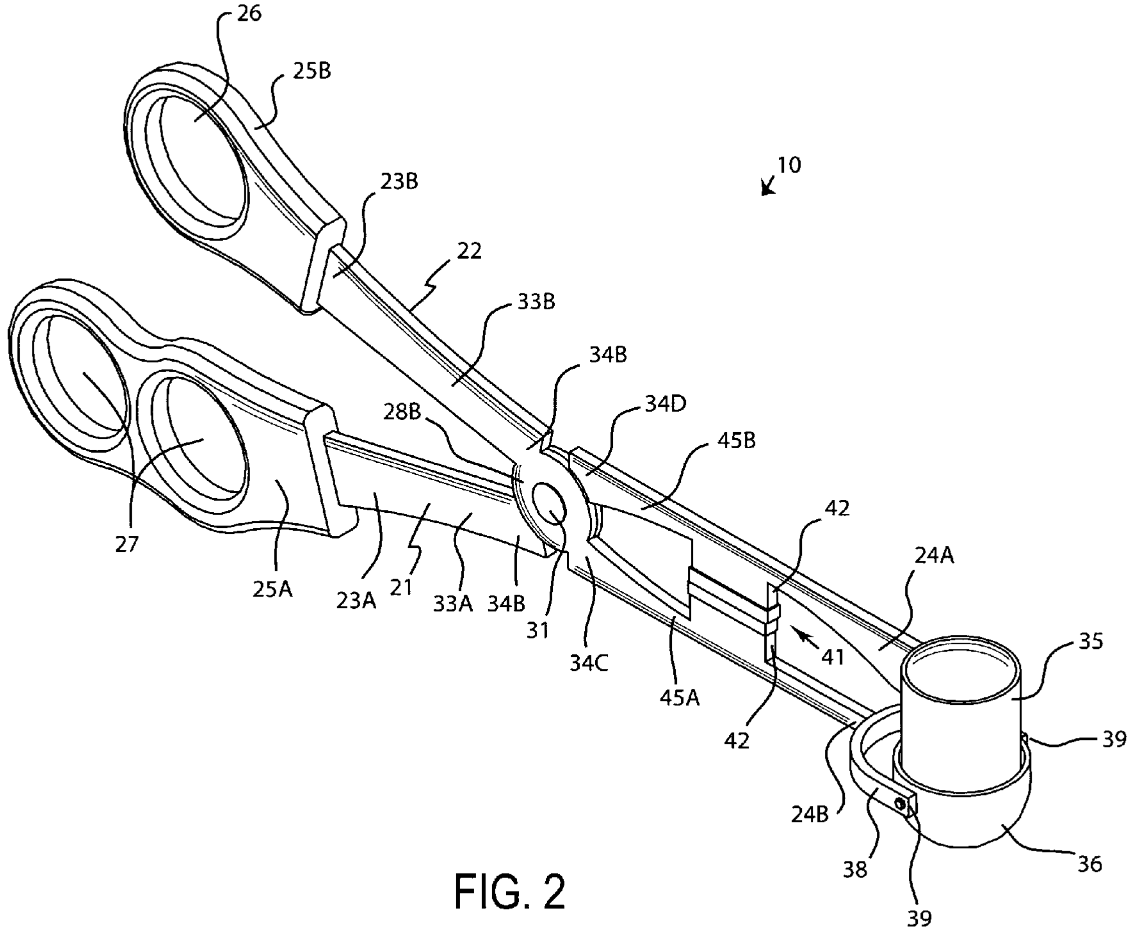
FIG. 2 is a perspective view of the apparatus shown in FIG. 1 biased to a pill crushing position.
Figure 3:
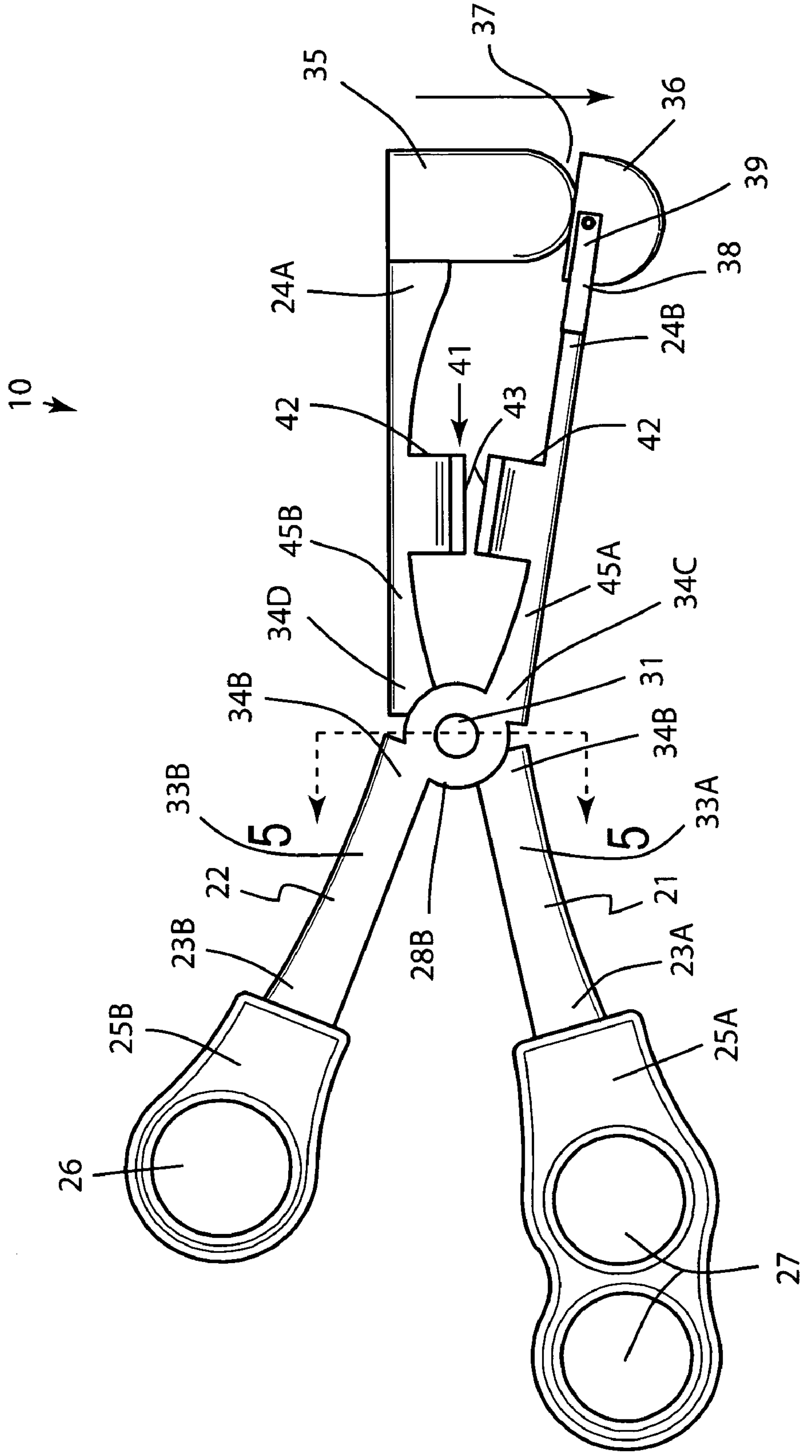
FIG. 3 is a side elevational view of the apparatus shown in FIG. 1.
Figure 4:
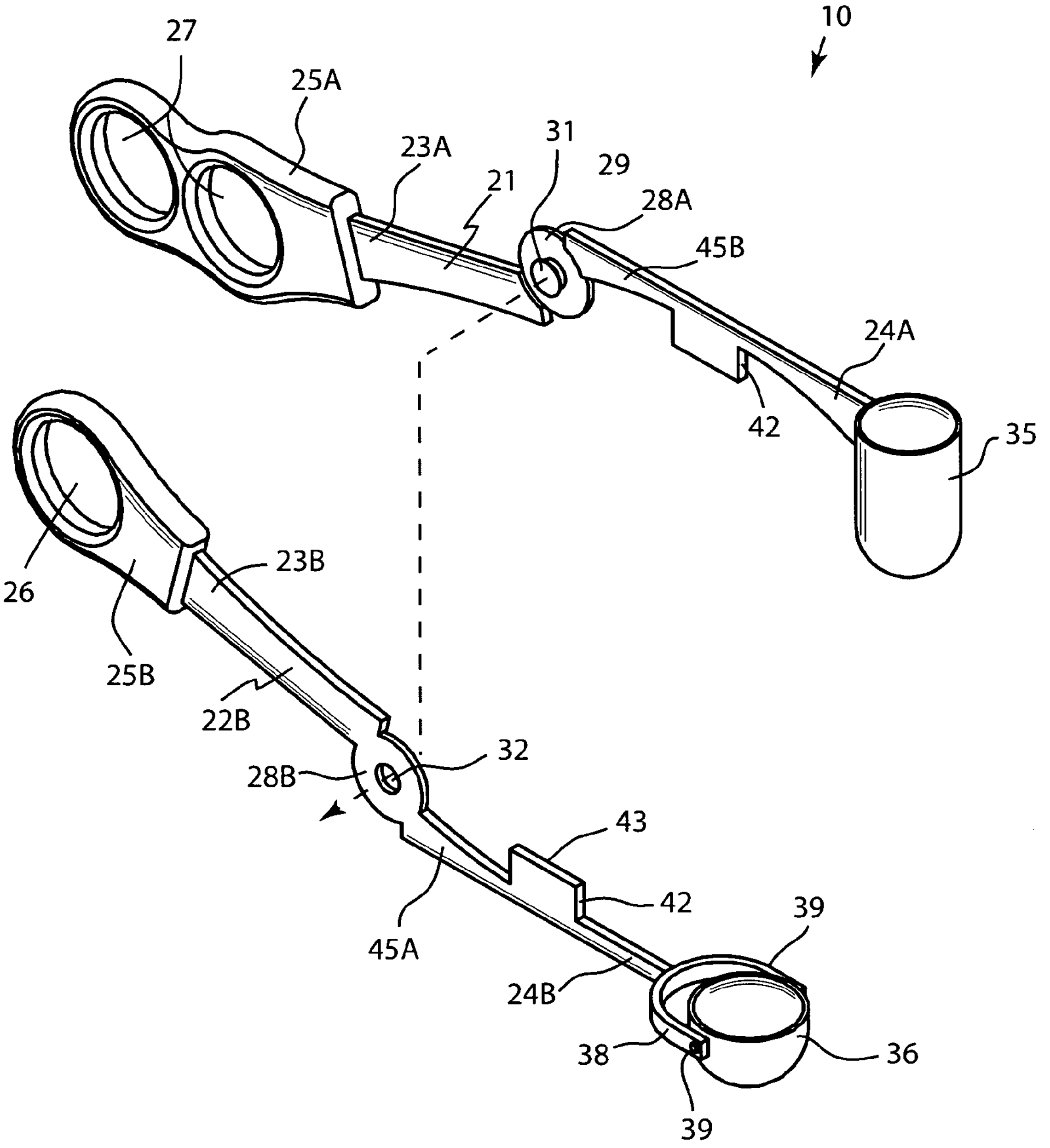
FIG. 4 is a side elevational view of the apparatus shown in FIG. 1 showing the first and second arms disconnected from each other.
Figure 5:
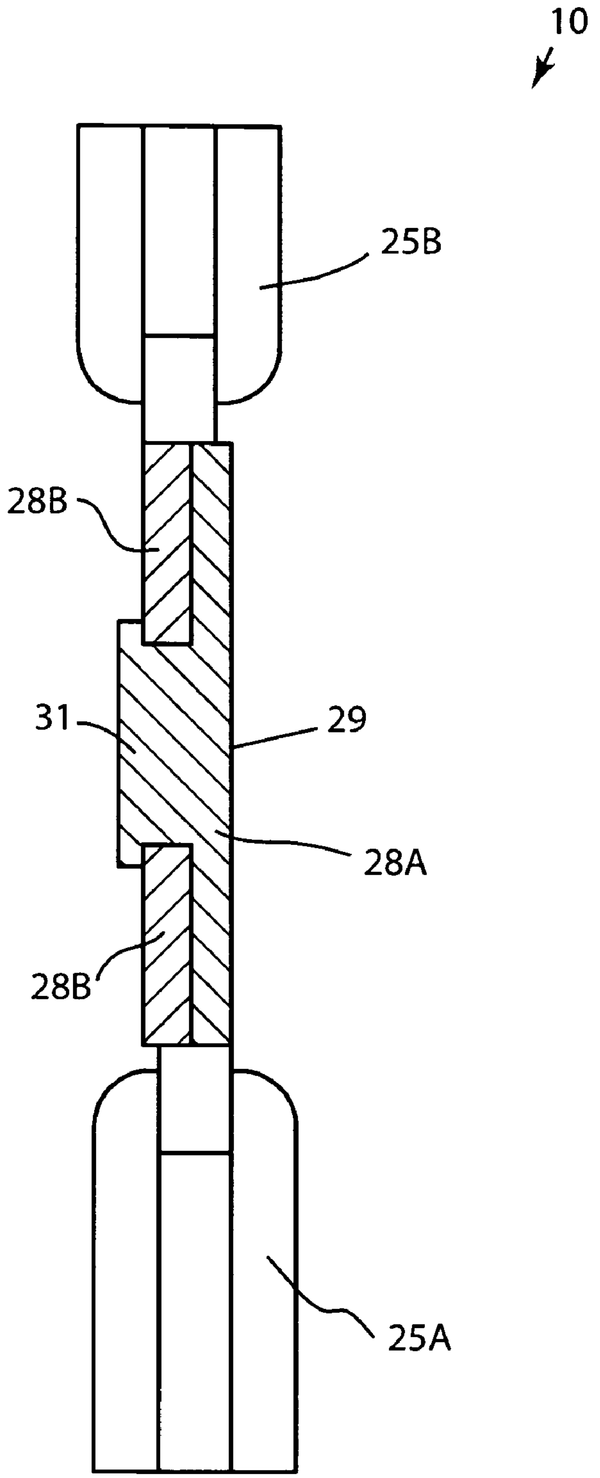
FIG. 5 is a cross-sectional view of the apparatus shown in FIG. taken along line 5-5.

The apparatus of this invention is referred to generally in FIGS. 1-5 by the reference numeral 10 and is intended to provide a hand-operable pill crushing apparatus. It should be understood that the apparatus 10 may be used to crush many different types of medicines and should not be limited in use to crushing only those pills described herein.

Referring initially to FIGS. 1, 2, 3, 4 and 5, the pill-crushing apparatus 10 includes first 21 and second 22 elongated arms that conveniently have axially offset proximal 23A, 23B and distal 24A, 24B ends respectively. Such a proximal end 23A of the first arm 21 is conveniently provided with a handle 25A directly coupled thereto, without the use of intervening elements, and has a pair of apertures 27 advantageously formed therein, which is essential such that a user can insert fingers into the handle 25A of the apparatus 10. Such a proximal end 23B of the second arm 22 has a handle 25B directly coupled thereto, without the use of intervening elements, and is provided with an opening 26 formed therein, which is essential such that a user may insert a thumb into the handle 25B of the apparatus 10.

The first 21 and second 22 arms are pivotally conjoined directly together, without the use of intervening elements, midway along respective longitudinal lengths thereof, which is vital such that the handles 25A, 25B of the first 21 and second 22 arms are releasably engaged during operating conditions. The longitudinal length of the first arm 21 is greater than the longitudinal length of the second arm 22, which is vital for overcoming prior art shortcomings of not providing sufficient leverage during pivoting movements. The present invention provides the unexpected advantage of removably interfitting the male block (described hereinbelow) into the female cup (described hereinbelow) while the female block is rotate away from a horizontally planar position. Thus, the pill is effectively crush no matter what position the female is disposed in. Of course, such arms 21, 22 can be produced in a variety of sizes, as is obvious to a person of ordinary skill in the art, so long as arm 21 maintains a greater longitudinal length than arm 22.

Again referring to FIGS. 1-5, each of the first 21 and second 22 arms is conveniently provided with a medially located annular portion 28A, 28B. Such an annular portion 28A of the first arm 21 has a solid body 29 and includes a centrally oriented rib 31 protruding outwardly therefrom. Such an annular portion 28B of the second arm 22 has an aperture 32 centrally formed therein. Such a rib 31 is rotatably seated within the aperture 32 of the annular portion 28B of the second arm 22. This associated structure is critical, such that the first 21 and second 22 arms are advantageously rotatable about a fulcrum axis without prematurely separating from each other during operating conditions.

Each of such first 21 and second 22 arms further includes a first substantially linear region 33A, 33B that has axially opposed ends 34A, 34B directly connected, without the use of intervening elements, to the associated handle 25A, 25B and an annular portion 28A, 28B respectively. A second substantially linear region 45A, 45B has axially opposed ends 34C, 34D directly connected, without the use of intervening elements, to an associated annular portion 28A, 28B and one of the male pill-crushing block 35 and the pill-holding cup 36 respectively (both herein described below). The first 33A, 33B and second 45A, 45B regions of the first 21 and second 22 arms are diametrically offset.

Referring to FIGS. 1, 2, 3 and 4, the first arm 21 includes a rigid male pill-crushing block 35 conveniently provided with a dome-shaped bottom surface 37. Such a male pill-crushing block 35 is statically coupled directly to a distal end 24A of the first arm 21, without the use of intervening elements. The second arm 22 conveniently has a pivotal female pill-holding cup 36 adjustably anchored directly to a distal end 24B of the second arm 22, without the use of intervening elements. Such a pill-holding cup 36 has a conveniently arcuate inner bottom surface, which is crucial such that the male block 35 is directly and removably interfitted, without the use of intervening elements, within the female cup 36 when the first 21 and second 22 arms are separated beyond a predetermined distance.

The pill-holding cup 36 has a convenient hollow semi-spherical shape for effectively containing the particulates therein. The pill-holding cup 36 advantageously articulates about a fulcrum axis registered orthogonal to the longitudinal length of the second arm 22 while the pill-crushing block 35 is removed from the pill-holding cup 36. The distal end 24B of the second arm 22 includes a U-shaped prong 38 conveniently provided with laterally spaced ends 39 that are pivotally coupled directly to the pill-holding cup 36, without the use of intervening elements, which is essential such that the pill-holding cup 36 freely rotates along a 360 degree path.

Again referring to FIGS. 1, 2, 3 and 4, the apparatus 10 further includes a mechanism 41 for effectively splitting a first pill into at least two separate halves when the first 25A and second 25B handles are pivotally disengaged such that a second pill is simultaneously pulverized within the pill-holding cup 36. Such a pill splitting mechanism 41 conveniently includes a plurality of shoulders 42 monolithically formed with the first 21 and second 22 arms and protruding away therefrom, which is critical such that the shoulders 42 directly mate, without the use of intervening elements, when the pill-crushing block 35 is nested within the pill-holding cup 36. Each of such shoulders 42 conveniently has a linear and planar engaging surface 43 for advantageously providing an equal and clean cut along the first pill. Of course, such a pill splitting mechanism 41 can be formed in a manner that allows splitting of a variety of differently sized and shaped pills, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A manually operable pill-crushing apparatus for adapting solid pills into particulates, said pill-crushing apparatus comprising:

first and second elongated arms having axially offset proximal and distal ends respectively, said proximal end of said first arm being provided with a handle directly coupled thereto and having a pair of apertures formed therein, said proximal end of said second arm having a handle directly coupled thereto and being provided with an opening formed therein, said first and second arms being pivotally conjoined directly together midway along respective longitudinal lengths thereof such that said handles of said first and second arms are releasably engaged during operating conditions;

wherein said first arm has a rigid male pill-crushing block provided with a dome-shaped bottom surface, said male pill-crushing block being statically coupled directly to a distal end of said first arm;

wherein said second arm has a pivotal female pill-holding cup adjustably anchored directly to a distal end of said second arm, said female cup having an arcuate inner bottom surface, said male block being directly and removably interfitted within said female cup when said first and second arms are separated beyond a predetermined distance;

wherein said female cup articulates about a fulcrum axis registered orthogonal to the longitudinal length of said second arm while said male pill-crushing block is removed from said female pill-holding cup; and means for splitting a first pill into at least two separate halves when said first and second handles are pivotally disengaged such that a second pill is simultaneously pulverized within said pill-holding cup, said pill splitting means comprises a plurality of shoulders monolithically formed with said first and second arms and protruding away therefrom such that said shoulders directly mate when said male pill-crushing block is nested within said pill-holding cup.

2. The pill-crushing apparatus of claim 1, wherein each of said first and second arms is provided with a medially located annular portion, said annular portion of said first arm having a solid body and including a centrally oriented rib protruding outwardly therefrom, said annular portion of said second arm having an aperture centrally formed therein, said rib being rotatably seated within said aperture of said annular portion of said second arm.

3. The pill-crushing apparatus of claim 1, wherein said distal end of said second arm includes a U-shaped prong provided with laterally spaced ends pivotally coupled directly to said pill-holding female cup such that said pill-holding female cup freely rotates along a 360 degree path.

4. The pill-crushing apparatus of claim 1, wherein each of said first and second arms further comprises:

a first substantially linear region having axially opposed ends directly connected to said associated handle and annular portion respectively; and a second substantially linear region having axially opposed ends directly connected to said associated annular portion and one of said male pill-crushing block and said pill-holding cup respectively;

wherein said first and second regions of said first and second arms are diametrically offset.

5. The pill-crushing apparatus of claim 1, wherein each of said shoulders have a linear and planar engaging surface for providing an equal and clean cut along the first pill.

6. A manually operable pill-crushing apparatus for adapting solid pills into particulates, said pill-crushing apparatus comprising:

first and second elongated arms having axially offset proximal and distal ends respectively, said proximal end of said first arm being provided with a handle directly coupled thereto and having a pair of apertures formed therein, said proximal end of said second arm having a handle directly coupled thereto and being provided with an opening formed therein, said first and second arms being pivotally conjoined directly together midway along respective longitudinal lengths thereof such that said handles of said first and second arms are releasably engaged during operating conditions, wherein the longitudinal length of said first arm is greater than the longitudinal length of said second arm;

wherein said first arm has a rigid male pill-crushing block provided with a dome-shaped bottom surface, said male pill-crushing block being statically coupled directly to a distal end of said first arm;

wherein said second arm has a pivotal female pill-holding cup adjustably anchored directly to a distal end of said second arm, said female cup having an arcuate inner bottom surface, said male block being directly and removably interfitted within said female cup when said first and second arms are separated beyond a predetermined distance;

wherein said female cup articulates about a fulcrum axis registered orthogonal to the longitudinal length of said second arm while said male pill-crushing block is removed from said female pill-holding cup; and means for splitting a first pill into at least two separate halves when said first and second handles are pivotally disengaged such that a second pill is simultaneously pulverized within said pill-holding cup, said pill splitting means comprises a plurality of shoulders monolithically formed with said first and second arms and protruding away therefrom such that said shoulders directly mate when said male pill-crushing block is nested within said pill-holding cup.

7. The pill-crushing apparatus of claim 6, wherein each of said first and second arms is provided with a medially located annular portion, said annular portion of said first arm having a solid body and including a centrally oriented rib protruding outwardly therefrom, said annular portion of said second arm having an aperture centrally formed therein, said rib being rotatably seated within said aperture of said annular portion of said second arm.

8. The pill-crushing apparatus of claim 6, wherein said distal end of said second arm includes a U-shaped prong provided with laterally spaced ends pivotally coupled directly to said pill-holding female cup such that said pill-holding female cup freely rotates along a 360 degree path.

9. The pill-crushing apparatus of claim 6, wherein each of said first and second arms further comprises:

a first substantially linear region having axially opposed ends directly connected to said associated handle and annular portion respectively; and a second substantially linear region having axially opposed ends directly connected to said associated annular portion and one of said male pill-crushing block and said pill-holding cup respectively;

wherein said first and second regions of said first and second arms are diametrically offset.

10. The pill-crushing apparatus of claim 6, wherein each of said shoulders have a linear and planar engaging surface for providing an equal and clean cut along the first pill.

11. A manually operable pill-crushing apparatus for adapting solid pills into particulates, said pill-crushing apparatus comprising:

first and second elongated arms having axially offset proximal and distal ends respectively, said proximal end of said first arm being provided with a handle directly coupled thereto and having a pair of apertures formed therein, said proximal end of said second arm having a handle directly coupled thereto and being provided with an opening formed therein, said first and second arms being pivotally conjoined directly together midway along respective longitudinal lengths thereof such that said handles of said first and second arms are releasably engaged during operating conditions, wherein the longitudinal length of said first arm is greater than the longitudinal length of said second arm;

wherein said first arm has a rigid male pill-crushing block provided with a dome-shaped bottom surface, said male pill-crushing block being statically coupled directly to a distal end of said first arm;

wherein said second arm has a pivotal female pill-holding cup adjustably anchored directly to a distal end of said second arm, said female cup having an arcuate inner bottom surface, said male block being directly and removably interfitted within said female cup when said first and second arms are separated beyond a predetermined distance, wherein said pill-holding cup has a hollow semi-spherical shape for effectively containing the particulates therein;

wherein said female cup articulates about a fulcrum axis registered orthogonal to the longitudinal length of said second arm while said male pill-crushing block is removed from said female pill-holding cup; and means for splitting a first pill into at least two separate halves when said first and second handles are pivotally disengaged such that a second pill is simultaneously pulverized within said pill-holding cup, said pill splitting means comprises a plurality of shoulders monolithically formed with said first and second arms and protruding away therefrom such that said shoulders directly mate when said male pill-crushing block is nested within said pill-holding cup.

12. The pill-crushing apparatus of claim 11, wherein each of said first and second arms is provided with a medially located annular portion, said annular portion of said first arm having a solid body and including a centrally oriented rib protruding outwardly therefrom, said annular portion of said second arm having an aperture centrally formed therein, said rib being rotatably seated within said aperture of said annular portion of said second arm.

13. The pill-crushing apparatus of claim 11, wherein said distal end of said second arm includes a U-shaped prong provided with laterally spaced ends pivotally coupled directly to said pill-holding female cup such that said pill-holding female cup freely rotates along a 360 degree path.

14. The pill-crushing apparatus of claim 11, wherein each of said first and second arms further comprises:

a first substantially linear region having axially opposed ends directly connected to said associated handle and annular portion respectively; and a second substantially linear region having axially opposed ends directly connected to said associated annular portion and one of said male pill-crushing block and said pill-holding cup respectively;

wherein said first and second regions of said first and second arms are diametrically offset.

15. The pill-crushing apparatus of claim 11, wherein each of said shoulders have a linear and planar engaging surface for providing an equal and clean cut along the first pill.

* * * * *